US010677896B2

(12) United States Patent
Wyrwas et al.

(10) Patent No.: US 10,677,896 B2
(45) Date of Patent: Jun. 9, 2020

(54) RESOLUTION ENHANCEMENT FOR SCANNING LIDAR/LADAR

(71) Applicant: QUALCOMM Incorporated, San Diego, CA (US)

(72) Inventors: John Wyrwas, Mountain View, CA (US); Volodimir Slobodyanyuk, San Diego, CA (US); Russell Gruhlke, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 370 days.

(21) Appl. No.: 15/612,906

(22) Filed: Jun. 2, 2017

(65) Prior Publication Data

US 2018/0348344 A1 Dec. 6, 2018

(51) Int. Cl.
*G01S 7/48* (2006.01)
*G01S 7/481* (2006.01)

(52) U.S. Cl.
CPC .......... *G01S 7/4817* (2013.01); *G01S 7/4816* (2013.01)

(58) Field of Classification Search
USPC ................................................ 356/3.01–5.15
See application file for complete search history.

(56) References Cited

U.S. PATENT DOCUMENTS

| 4,967,183 | A | * | 10/1990 | D'Ambrosia | G01S 7/4811 340/552 |
|---|---|---|---|---|---|
| 7,400,384 | B1 | | 7/2008 | Evans et al. | |
| 9,239,959 | B1 | | 1/2016 | Evans et al. | |
| 2010/0258708 | A1 | | 10/2010 | Meyers et al. | |
| 2011/0205388 | A1 | * | 8/2011 | Iwane | G06T 1/00 348/222.1 |
| 2016/0259038 | A1 | * | 9/2016 | Retterath | G01S 7/4802 |
| 2016/0274589 | A1 | | 9/2016 | Templeton et al. | |

* cited by examiner

*Primary Examiner* — James R Hulka
(74) *Attorney, Agent, or Firm* — Kilpatrick Townsend & Stockton

(57) ABSTRACT

Disclosed herein are techniques for affecting the resolution of an optical scanning system. More specifically, a receiver of the optical scanning system includes a set of photodetectors and an optical beam directing subsystem. The optical beam directing subsystem is configured to, in each scan step of a plurality of scan steps, receive light reflected from a target region illuminated by a scanning beam and including a plurality of areas, and direct light reflected from each area of the plurality of areas to a corresponding photodetector in the set of photodetectors. Each photodetector of the set of photodetectors receives light reflected from a corresponding area of the plurality of areas to generate a detection signal.

19 Claims, 12 Drawing Sheets

RESOLUTION ENHANCEMENT FOR SCANNING LIDAR/LADAR

BACKGROUND

Light Imaging, Detection, And Ranging or LIght Detection and Ranging (LIDAR) or LAser Detection and Ranging (LADAR) systems may be used for remote sensing in a variety of applications, such as automotive, gaming, consumer electronics, and industrial application. For any of these applications, a LIDAR/LADAR system may generally need to meet certain spatial resolution and sensitivity requirements.

BRIEF SUMMARY

Techniques disclosed herein may affect the resolution of an optical scanning system with a large scanning beam and/or a coarse scan step by use of a detection optical subsystem that may map a field of view of the optical scanning system onto a detector array that may be reused in one or more other scan steps.

In accordance with an example implementation, a receiver of an optical scanning system may include a set of photodetectors, and an optical beam directing subsystem. The optical beam directing subsystem may be configured to, in each scan step of a plurality of scan steps, receive light reflected from a region in a far field, the region illuminated by a scanning beam and including a plurality of areas; and direct light reflected from each area of the plurality of areas to a corresponding photodetector in the set of photodetectors. Each photodetector of the set of photodetectors may receive light reflected from a corresponding area of the plurality of areas to generate a detection signal.

In accordance with an example implementation, a method for scanning a far field using optical beams in a plurality of scan steps may include, in each scan step, receiving light reflected from a region of the far field, the region illuminated by a scanning beam and including a plurality of areas; directing light reflected from each area of the plurality of areas to a corresponding photodetector of a plurality of photodetectors; and generating a detection signal for each area of the plurality of areas by the corresponding photodetector. The number of photodetectors in the plurality of photodetectors may be equal to or greater than the number of areas in the plurality of areas illuminated by the scanning beam in each scan step, but may be less than the total number of areas in the far field. The same plurality of photodetectors may be used in each scan step of the plurality of scan steps.

In accordance with another example implementation, an apparatus may be provided, which may include means for, in each scan step of a plurality of scan steps, receiving light reflected from a region of a far field, the region illuminated by a scanning beam and comprising a plurality of areas. The apparatus may also include means for, in each scan step of the plurality of scan steps, generating a detection signal for each area of the plurality of areas. The apparatus may further include means for, in each scan step of the plurality of scan steps, directing light reflected from each area of the plurality of areas to a corresponding means for generating the detection signal. In each scan step of the plurality of scan steps, each means for generating the detection signal may receive light reflected from a corresponding area of the plurality of areas to generate the detection signal.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

FIG. 8A illustrates an example optical path from a first area of a target object to a first detector in a detector array in an optical scanning system, according to some aspects of the present disclosure.

FIG. 8B illustrates an example optical path from a second area of a target object to a second detector in a detector array in an optical scanning system, according to some aspects of the present disclosure.

FIG. 8C illustrates an example optical path from a third area of a target object to a first detector in detector array in an optical scanning system, according to some aspects of the present disclosure.

FIG. 8D illustrates an example optical path from a fourth area of a target object to a second detector in detector array in an optical scanning system, according to some aspects of the present disclosure.

FIG. 9A illustrates an example optical path from a first area of a target object to a first detector in a detector array of an optical scanning system, according to certain aspects of the present disclosure.

FIG. 9B illustrates an example optical path from a second area of the target object to a second detector in the detector array of an optical scanning system, according to certain aspects of the present disclosure.

DETAILED DESCRIPTION

Figure 1:
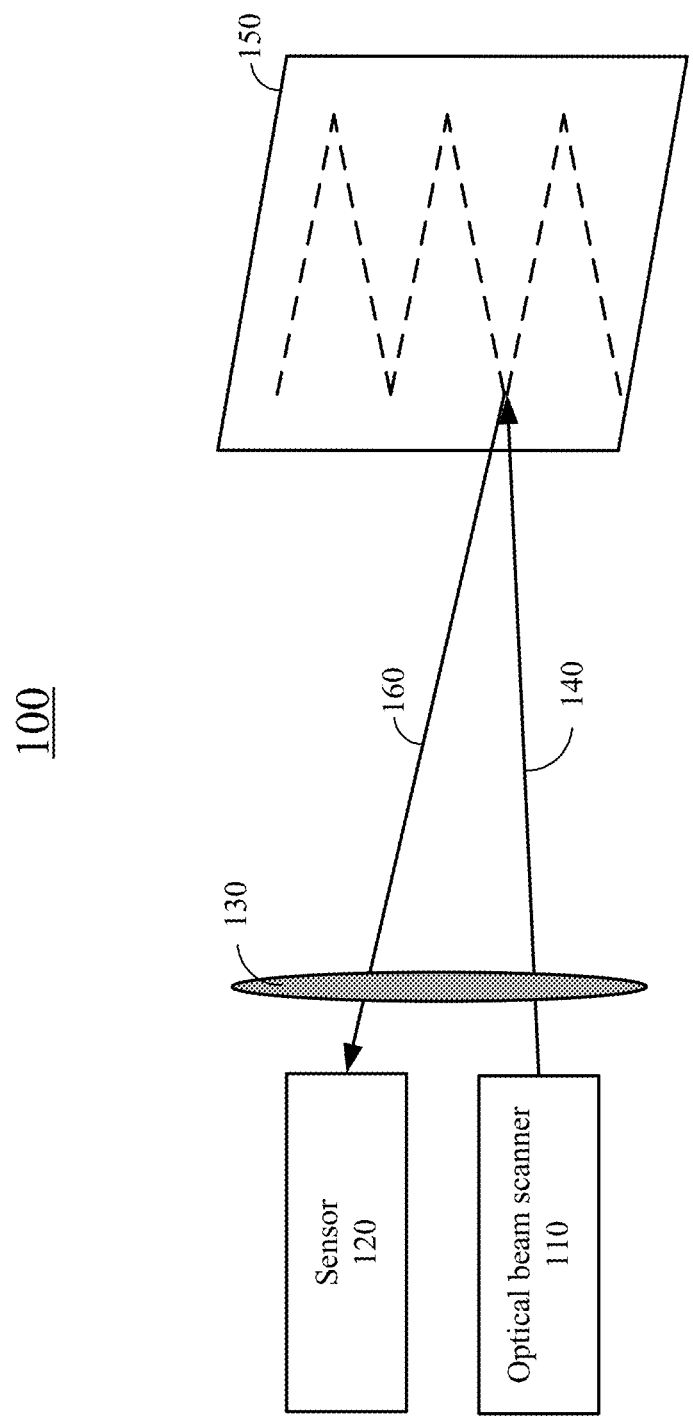
FIG. 1 is a simplified block diagram of an example optical scanning system.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Techniques disclosed herein use a detection optical subsystem that can map the entire field of view of an optical scanning system (e.g., a LIDAR system or a LADAR system) onto a detector array to affect (e.g., change, potentially increase) the resolution of the optical scanning system, possibly without the use of a fine scan step or the like, or a smaller-sized scanning beam, or a larger detector array, or some combination thereof. For simplicity, unless otherwise stated, the term "LIDAR system" is used herein to represent any applicable type or form of an optical scanning system including, for example, a LIDAR system, a LADAR system, or the like or some combination thereof.

With this in mind, in certain aspects, an entire field of view of a LIDAR system may be covered by the beam spots of a scanning beam at, for example, M different directions (M scan steps), where the beam spot for each scan direction may be much larger than the desired resolution of the LIDAR system, and thus M may be a number much smaller than the area of the entire field of view divided by the desired resolvable area of the LIDAR system. The returned beam of the scanning beam in each scan step may be directed by the detection optical subsystem onto a detector array having, for example, N detectors, where, in each scan step, many or all of the N detectors in the detector array may receive light returned from an area illuminated by the scanning beam and each detector may have a field of view that only includes a fraction of the total field of view of the LIDAR system in one scan step. Thus, by scanning the light beam at M directions and using a detector array having N detectors, up to M×N detection signals may be obtained, which may then be used to reconstruct the profile or image of a target object in a far field at a spatial resolution much higher than the resolution determined by the beam size and/or scan step of the scanning beam.

In one embodiment, a system may include a plurality of detectors and an optical beam directing subsystem. The scanning beam of the system may have a large beam spot in the far field. The optical beam directing subsystem may include a plurality of elements, and the number of elements of the optical beam directing subsystem may be equal to or larger than the number of detectors in the plurality of detectors. In each scan step, some elements of the optical beam directing subsystem may receive a light beam returned from an area of a target object in a far field illuminated by a scanning beam, and each of these elements of the optical beam directing subsystem may direct a portion of the returned light beam to a corresponding detector of the plurality of detectors. In this way, a detector may be reused to receive a portion of the returned light beam directed by one or more elements of the optical beam directing subsystem in each scan step to generate the detection signals for reconstructing the profile or image of the target object. Therefore, a high resolution may be achieved with a large scanning beam size and a large scan step (and therefore a faster scanning speed and a lower requirement on the beam scanning subsystem), and a small number of detectors. Thus, the overall cost of the system may be reduced without sacrificing the performance of the system. To further improve the resolution of the system, the number of elements on the optical beam directing subsystem (in the receiver of the system) may be increased, without changing the beam scanning subsystem (the transmitter of the system) and/or the number of detectors.

A LIDAR system, also referred to as a LADAR system, is an active remote sensing system that can be used to obtain the range from a source to one or more points on a target. A LIDAR uses a light beam, typically a laser beam, to illuminate the one or more points on the target. Compared with other light sources, a laser beam may propagate over long distances without spreading significantly (highly collimated), and can be focused to small spots to deliver very high optical power densities and provide fine scan resolution. The laser beam may be modulated such that the transmitted laser beam includes a series of pulses. The transmitted laser beam may be directed to a point (or an area) on the target, which may reflect the transmitted laser beam. The laser beam reflected from the point on the target can be measured by an optical detector, and the time of flight (ToF) from the time a pulse of the transmitted light beam is transmitted from the source to the time the pulse arrives at the optical detector near the source or at a known location may be determined. The range from the source to the point on the target may then be determined by, for example, $r=c\times t/2$, where r is the range from the source to the point on the target, c is the speed of light in free space, and t is the ToF of the pulse of the light beam from the source to the optical detector.

FIG. 1 is a simplified block diagram of an example optical scanning system 100, such as a LIDAR, LADAR, or other like system. Optical scanning system 100 may include an optical beam scanner 110, a sensor 120, and an optical subsystem 130. Optical beam scanner 110 may include an optical source, such as a laser, a laser diode, a vertical cavity surface-emitting laser (VCSEL), a light-emitting diode (LED), or other suitable type of light emitting device. The laser may be, for example, an infrared pulsed fiber laser or other mode-locked or electrical pulse-modulated laser with an output wavelength of, for example, about 650 nm, about 850 nm, 930-960 nm, 1030-1070 nm, about 1300 nm, around 1550 nm, or longer. Optical beam scanner 110 may also include a light directing device, such as a scanning stage, a piezoelectric actuator, or a microelectromechanical system (MEMS) device that can change the propagation direction of the transmitted laser beam from the optical source. Optical subsystem 130 may be used to collimate the transmitted laser beam from optical beam scanner 110 such that collimated laser beam 140 may propagate over a long distance to a target 150 without spreading significantly.

Optical subsystem 130 may also be used to focus a returned laser beam 160 from target 150 onto sensor 120 directly or into optical fibers connected to sensor 120. Sensor 120 may be an optical detector having a working (sensitive) wavelength comparable with the wavelength of the optical source in optical beam scanner 110. The optical detector may be a high-speed photodetector, for example, a photodiode with an intrinsic semiconductor region between a p-type semiconductor region and an n-type semiconductor region (PIN photodiode), or an InGaAs avalanche photodetector (APD). Sensor 120 may include a one-dimensional (1-D) or two-dimensional (2-D) detector array.

To measure ranges to multiple points on a target or in a field of view (FOV) of a system, a laser beam is usually scanned in one or two dimensions as shown in FIG. 1. In order to achieve a 1-D or 2-D scan pattern, a system may use, for example, an array of lasers, multiple sets of lasers/sensors that are slightly tilted against each other, or other 2-D scanning mechanisms, such that the laser beam may be scanned in, for example, a horizontal raster pattern and/or a vertical raster pattern as shown in FIG. 1.

In some implementations, a 2-D scan pattern may be produced with a single 2-axis actuator. For example, if the horizontal axis produces a constant amplitude sine wave, and the vertical axis produces a cosine wave with the same frequency and amplitude as the sine wave, a circular scanning pattern may be generated. The scanning amplitudes on both the x and y axes can also be progressively decreased and/or increased to produce a spiral scan pattern by progressively decreased and/or increased control signals. As a more specific example, if the horizontal scanning is controlled by a triangle amplitude-modulated sine wave and the vertical scanning is controlled by a triangle amplitude-modulated cosine wave, an evenly spaced spiral scan pattern may be generated.

There are many different types of laser beam scanning mechanisms, such as, for example, a multi-dimensional mechanical stage, a Galvo-controlled mirror, a MEMS mirror driven by micro-motors, a piezoelectric translator/transducer using piezoelectric materials (e.g., a quartz, an aluminum nitride (AlN) thin film, or a lead zirconate titanate (PZT) ceramic), an electromagnetic actuator, or an acoustic actuator. Laser beam scanning may also be achieved without mechanical movement of any component, for example, using a phased array technique where phases of light beams in a 1-D or 2-D array may be changed to alter the wave front of the superimposed laser beam. Many of the above-described beam scanning mechanisms may be bulky and expensive. In some LIDAR systems, alternatively or additionally, a resonant fiber scanning technique may be used to scan a laser beam. Due to the flexibility of the optical fiber, a fast scanning speed, a wide field of view and/or a high resolution may be achieved. In addition, a resonant fiber beam scanner may be small and less expensive. In some LIDAR systems, resonant-driven MEMS mirrors may also be used to achieve a fast scanning speed.

The position or scanning angle of the scanning beam may be determined based on the control signals that drive the scanning mechanisms, such that the system can determine the point on the target that reflects a particular transmitted light beam at a given time. For example, in FIG. 1, the position of the transmitted beam on optical subsystem 130 and thus the position of the transmitted beam on target 150 may be determined based on the signal that controls optical beam scanner 110 in optical scanning system 100. As a more specific example, in a system with a MEMS micro-mirror driven by micro-motors, the orientation of the MEMS micro-mirror may be determined based on the signals that control the micro-motors that rotate the micro-mirror. The direction of the reflected beam by the micro-mirror and thus the position of the beam on optical subsystem 130 at a given time can then be determined based on the orientation of the micro-mirror at the given time.

The spatial resolution of a LIDAR system may be determined at least in part by the minimum scan step of the beam scanner and the minimum size or divergence of the scanning light beam. For example, in certain implementations, the optics in a LIDAR system may collimate the light beam into a beam with no greater than about 0.1 degree in divergence, and the beam scanner may move the center of the light beam in a step of no greater than about 0.1 degree. In some systems, the step size of the beam scanner and/or the beam size/shape of the scanning light beam shaped by the optics may not be able to meet the requirement of the application of the LIDAR system. For example, in certain advanced beam scanning solutions, such as MEMS mirrors, optical phased arrays, or actuated optical-fibers/waveguides, a minimum beam divergence achieved may be fairly large (e.g., 2 degrees or larger). Thus, a beam spot of the scanning light beam at a far field may be fairly large. In some applications, even if a light beam can be scanned in fine steps, it may take a long time to scan an area in the far field, and timing constraints of the application may limit a step size to one larger than that required by the application to achieve the desired resolution.

Techniques disclosed herein may improve the resolution of an optical scanning system by improving the receiver portion of the optical scanning system. Thus, a beam scanning subsystem with a large scanning beam and coarse scan step may be used to possibly improve a scan speed and/or possibly reduce a cost of the optical scanning system, possibly without compromising resolution of the system.

Figure 2:
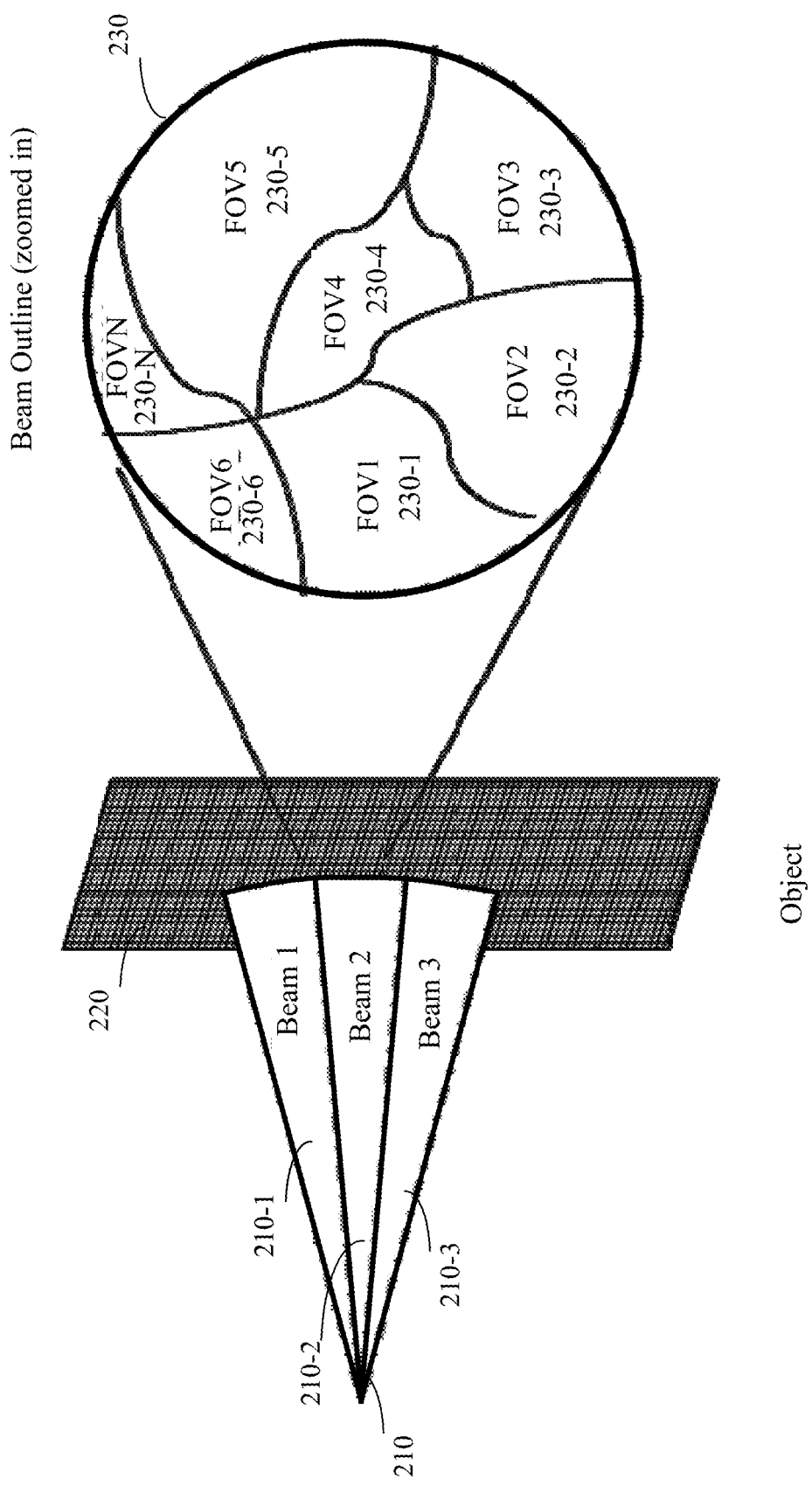
FIG. 2 illustrates example field of views of a plurality of detectors in a scan step of an example detection optical subsystem of an optical scanning system, according to some aspects of the present disclosure.

FIG. 2 illustrates example field of views of a plurality of detectors in a scan step of an example detection optical subsystem of an optical scanning system (e.g., a LIDAR system), according to some aspects of the present disclosure. As shown in FIG. 2, each scanning beam 210 of the LIDAR system may illuminate a spot on a target 220 in the far field (shown by the zoomed-in view) that includes a portion 230 of the entire field of view (FOV) of the LIDAR system. The portion 230 of the entire FOV of the LIDAR system may include, many small individual FOVs, such as, for example, FOV 1 (230-1), FOV 2 (230-2), FOV 3 (230-3), FOV 4 (230-4), FOV 5 (230-5), FOV 6 (230-6), . . . , and FOV N (230-6), each of which may correspond to the field of view of detector 1, 2, 3, 4, 5, 6, . . . , or N of a detector array in the detection optical subsystem of the LIDAR system in each scan step. During the scanning of the LIDAR system, a first scanning beam 210-1 may illuminate spot 1 on target 220, and the detection optical subsystem may direct the reflected beam from spot 1 on target 220 to detectors 1-N and read N detection signals from detectors 1-N; the light beam may then illuminate spot 2 on target 220, and the detection optical subsystem may direct the reflected beam from spot 2 on target 220 to detectors 1-N and read N detection signals from detectors 1-N again; . . . the light beam may illuminate spot M on target 220, and the detection optical subsystem may direct the reflected beam from spot M on target 220 to detectors 1-N and read N detection signals from detectors 1-N. Thus, the total number of resolvable data points for the M scanning spots is M×N. This effectively improves the system resolution of the LIDAR system by a factor of N while reducing the scan time and requirements on the beam scanner and the size and/or divergence of the scanning beam.

The detection optical subsystem that can map the entire field of view of the LIDAR system onto a detector array may be implemented in many different ways. For example, in some implementations, the detection optical subsystem may include a plurality of segments, each segment corresponding to one scanning beam spot and including multiple elements each corresponding to a detector in the detector array. The number and arrangement of the detectors in the detector array may vary, and the elements in each segment may be designed such that the field of view for each detector in the detector array many be arranged as desired as shown in FIG. 2. A detector array with a large number of detectors and a detection optical subsystem with a large number of segments, such as, for example, more than 100, 1000, 10000 or more, may be used to improve the resolution of the LIDAR system. The selection of the number of segments and detectors may be a tradeoff between the cost, resolution, sensitivity, and size of the detection optical subsystem. For illustration purposes only and without loss of generality, some example detection optical subsystems are described below as having a small representative set of segments and detectors.

Figure 3:
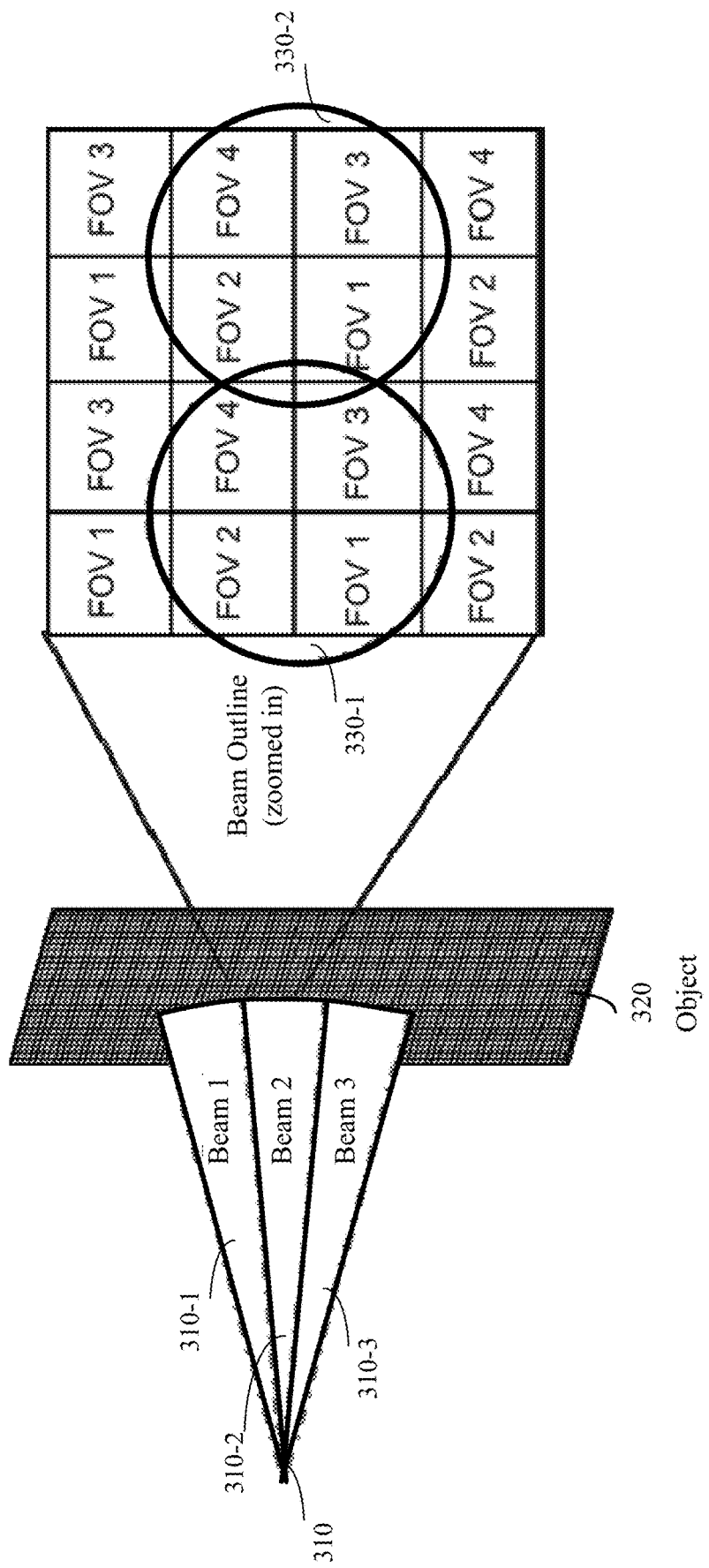
FIG. 3 illustrates example field of views of a plurality of detectors in multiple scan steps of an example detection optical subsystem of an optical scanning system, according to certain aspects of the present disclosure.

FIG. 3 illustrates example field of views of a plurality of detectors of an example detection optical subsystem of an optical scanning system (e.g., a LIDAR system) in multiple scan steps, according to certain aspects of the present disclosure. The detection optical subsystem in FIG. 3 includes four (4) detectors arranged in an array, such as a 2×2 array or a linear array. Each scanning beam 310 of the LIDAR system may illuminate a spot on a target 320 in the far field that includes a portion of the field of view (FOV) of the LIDAR system. The portion of the FOV of the LIDAR system illuminated by a scanning beam may include, for example, FOV 1, FOV 2, FOV 3, and FOV 4, each of which corresponds to the field of view of detector 1, 2, 3, or 4 in the detection optical subsystem of the LIDAR system during a scan step. In one scan step, the scanning beam may illuminate a spot 330-1 on target 320, and the detection optical subsystem may direct the reflected beam from spot 330-1 on target 320 to detectors 1-4, where light beam reflected from an area in spot 330-1 corresponding to FOV 1, FOV 2, FOV 3, or FOV 4 may be directed by the detection optical subsystem to detector 1, 2, 3, or 4, respectively. In the next scan step, the scanning beam may illuminate a spot 330-2 on target 320, and the detection optical subsystem may direct the light beam reflected from an area in spot 330-2 corresponding to FOV 1, FOV 2, FOV 3, or FOV 4 to detector 1, 2, 3, or 4, respectively. In this way, the same four detectors may be used in each scan step to detect light beam reflected from different areas on target 320, where each detector may be used to detect light beams reflected from discontinuous areas on target 320 during the beam scanning.

Figure 4:
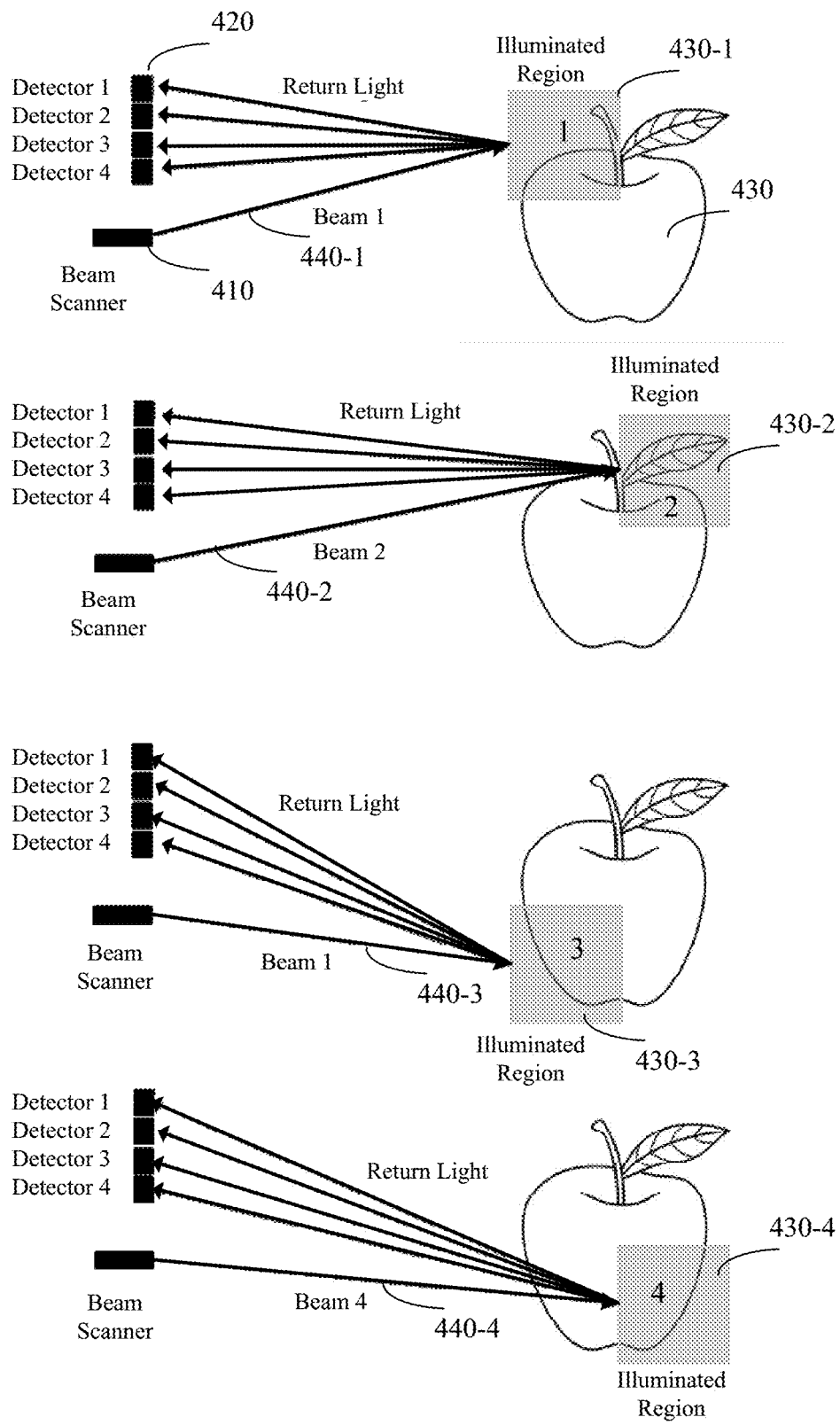
FIG. 4 illustrates an example detection optical subsystem for an optical scanning system, according to some aspects of the present disclosure.

FIG. 4 illustrates an example detection optical subsystem for an optical scanning system (e.g., a LIDAR system), according to some aspects of the present disclosure. The LIDAR system may include a beam scanner 410 configured to scan a light beam at different directions to illuminate different areas on a target object 430 in the far field. The detection optical subsystem includes four (4) segments and four (4) detectors in a detector array 420. Detector array 420 may be a one-dimensional array or a two-dimensional array. It is noted that, in various implementations, any number of detectors may be used in the detector array and the detection optical subsystem may include any number of segments.

As shown in FIG. 4, in each scan step of the four example scan steps, one region on target object 430 in the far field may be illuminated by the scanning beam. The reflected beam from the illuminated region may be directed to the four segments of the detection optical subsystem, where each segment may correspond to a detector in detector array 420 and may include a mask that would filter the light and only allow light to pass through certain areas of the mask to reach the detector. For example, light beam 440-1 from beam scanner 410 may illuminate region 1 (430-1) of target object 430, the reflected beam from region 1 may be directed to the four segments of the detection optical subsystem, and, in each segment of the four segments, the mask may allow reflected beam from only a corresponding area of region 1 to pass through and be detected by the detector. Similarly, light beam 440-2 from beam scanner 410 may illuminate region 2 (430-2) of target object 430, the reflected beam from region 2 may be directed to the four segments of the detection optical subsystem, and, in each segment of the four segments, the mask may allow reflected beam from only a corresponding area of region 2 to pass through and be detected by the detector. Light beam 440-3 from beam scanner 410 may illuminate region 3 (430-3) of target object 430, the reflected beam from region 3 may be directed to the four segments of the detection optical subsystem, and, in each segment of the four segments, the mask may allow reflected beam from only a corresponding area of region 3 to pass through and be detected by the detector. Light beam 440-4 from beam scanner 410 may illuminate region 4 (430-4) of target object 430, the reflected beam from region 4 may be directed to the four segments of the detection optical subsystem, and, in each segment of the four segments, the mask may allow reflected beam from only a corresponding area of region 4 to pass through and be detected by the detector.

Figure 5:
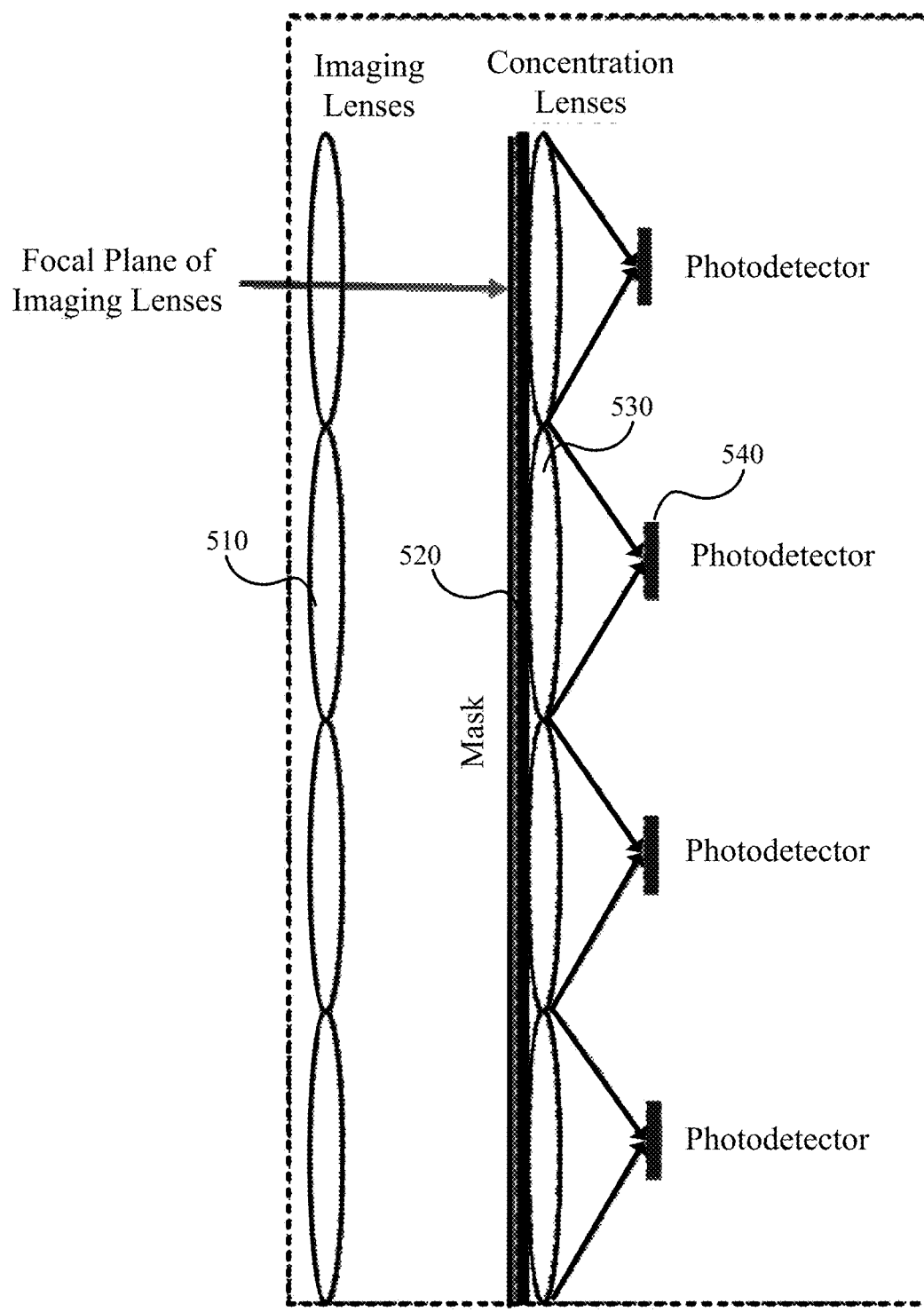
FIG. 5 illustrates an example detection optical subsystem, according to certain aspects of the present disclosure.

FIG. 5 illustrates an example detection optical subsystem 500, according to certain aspects of the present disclosure. Detection optical subsystem 500 may be used in the LIDAR system of FIG. 4. Detection optical subsystem 500 may include an imaging lens array 510 including a plurality of imaging lenses, a mask 520 on an image plane (e.g., a focal plane) of imaging lens array 510, an optional concentration lens array 530, and a photodetector array 540 including a plurality of detectors. Each of imaging lens array 510, concentration lens array 530, and photodetector array 540 may be arranged as a one-dimensional or two-dimensional array, or any other pattern. Detection optical subsystem 500 may include a plurality of segments. Each segment of detection optical subsystem 500 may include an imaging lens from imaging lens array 510, a corresponding segment of mask 520, a corresponding concentration lens from concentration lens array 530, and a corresponding detector from photodetector array 540. The imaging lens in each segment may project the light beam returned from a target object in the far field on the image plane of the imaging lens. Mask 520 may be positioned on the focal plane of the imaging lens and may only allow light from selected areas of the image of the target object to pass through. The light that passes through the mask may then optionally be concentrated onto the detector by the concentration lens. In some implementations, the detector may be positioned adjacent to mask 520 on the image plane, without a concentration lens between mask 520 and the detector.

Figure 6:
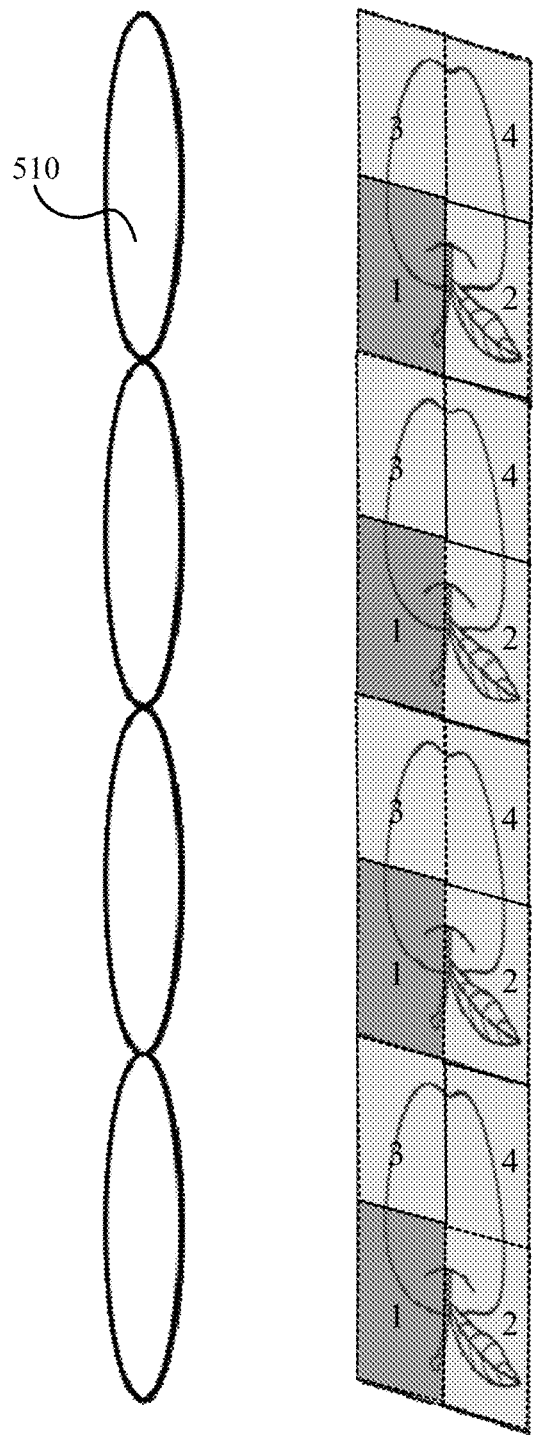
FIG. 6 illustrates images of a target object on an image plane of an example imaging lens array, according to certain aspects of the present disclosure.

FIG. 6 illustrates images of a target object in a far field on an image plane of an example imaging lens array, such as imaging lens array 510 of FIG. 5. For example, if the entire region that includes target object 430 in FIG. 4 is illuminated by a scanning beam, the returned light from target object 430 may be projected by each imaging lens from imaging lens array 510 on the image plane to form an image of target object 430. When only a region of the entire area that includes target object 430 is illuminated, the image on the image plane may only include the image of the illuminated portion of target object 430. For example, when only region 1 (430-1) in FIG. 4 is illuminated by the scanning beam, each image of target object 430 formed by each imaging lens from imaging lens array 510 may include region 1 shown in FIG. 6. Similarly, when only region 2 (430-2), region 3 (430-3), or region 4 (430-4) of target object 430 shown in FIG. 4 is illuminated by the scanning beam, each image of target object 430 formed by each imaging lens from imaging lens array 510 may only include region 2, 3, or 4, respectively, as shown in FIG. 6.

Figure 7:
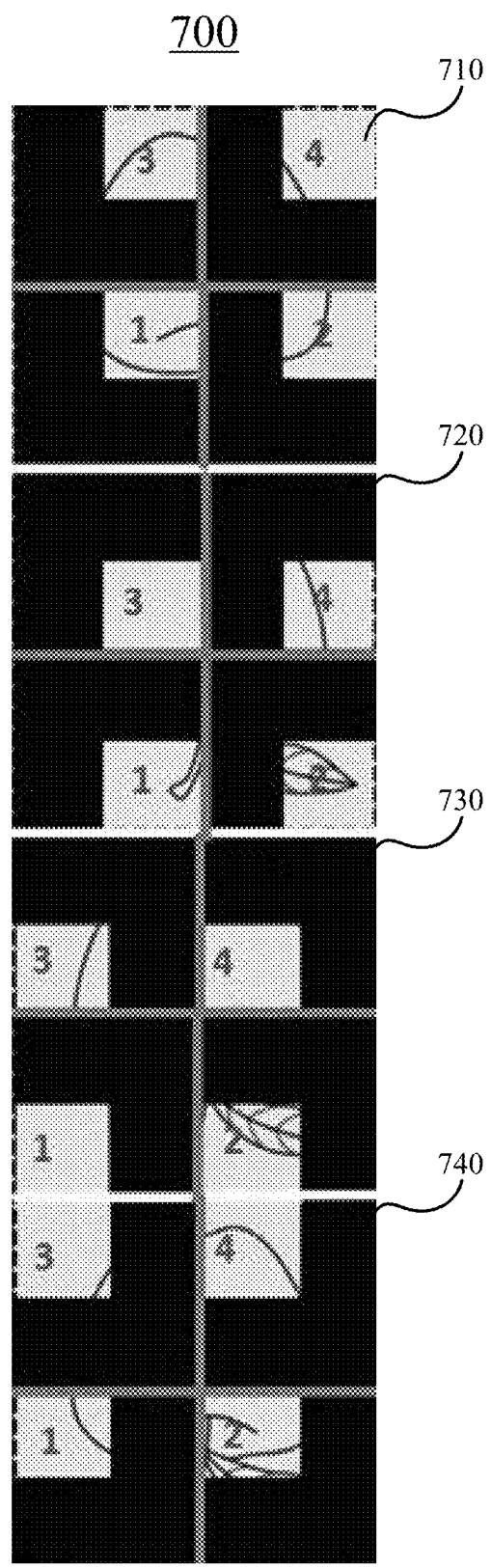
FIG. 7 illustrates an example mask 700, such as mask 520 of FIG. 5, according to certain aspects of the present disclosure.

FIG. 7 illustrates an example mask 700, such as mask 520 of FIG. 5, according to certain aspects of the present disclosure. Mask 700 may include 4 segments 710, 720, 730, and 740, each corresponding to one segment of the four segments of detection optical subsystem 500. Each segment of mask 700 may be placed in front of one detector from photodetector array 540 in detection optical subsystem 500. The mask may be a reflective or transmissive mask, and may include areas that can direct light to the detectors (shown as bright areas) and areas that can direct light away from the detector (shown as dark areas). Each mask may block light directed onto the dark areas, and allow light directed onto the bright areas to reach the corresponding detector. In some embodiments, the mask may be a light valve, such as a light valve based on Digital Light Processing (DLP), liquid crystal on silicon (LCoS), or microelectromechanical system (MEMS) technologies.

The number n (1-4) shown in each bright area indicates that the corresponding area on the target object may be illuminated by the nth scanning beam. For example, in the first scan step, the first scanning beam may only illuminate region 1 (430-1) of target object 430 as shown in FIG. 4, and the returned beam may be imaged onto the focal plane of the imaging lens and illuminate the bottom left quadrant of each of the 4 segments 710-740 of mask 700. Each segment of mask 700 may, for example, filter the light and only allow the light to pass through the bright area (i.e., one fourth of the illuminated quadrant). The light that passes through each segment of mask 700 may be detected by the detector behind each mask. In other words, in scan step 1, scanning beam 1 (440-1) may illuminate region 1 (430-1) of target object 430; the returned light from illuminated region 1 (430-1) of target object 430 may be used by an imaging lens to form an image of the illuminated region 1 of target object 430 on the image plane; the bottom left quadrant of each segment of mask 700 may be illuminated by the image of the illuminated region 1 of target object 430; one quarter of the bottom left quadrant of each segment of mask 700 (bright areas marked with "1") may allow light to pass through and reach the corresponding detector; and four detection signals may be generated, one by each detector, in scan step 1. Similarly, in scan step 2, scanning beam 2 (440-2) may illuminate region 2 (430-2) of target object 430; the bottom right quadrant of each segment of mask 700 may be illuminated by an image of the illuminated region 2 of target object 430 formed by a corresponding imaging lens using the returned light from region 2 (430-2) of target object 430; one quarter of the bottom right quadrant of each segment of mask 700 (bright areas marked with "2") may allow light to pass through and reach the corresponding detector; and four detection signals may be generated, one by each detector, in scan step 2. In scan step 3, one quarter of the top left quadrant of each segment of mask 700 (bright areas marked with "3") may allow light to pass through and reach the corresponding detector. In scan step 4, one quarter of the top right quadrant of each segment of mask 700 (bright areas marked with "4") may allow light to pass through and reach the corresponding detector. As a result, the total field of view of each detector may include 4 noncontiguous areas, one for each scan step, as shown by the 4 noncontiguous bright areas (marked with "1"-"4") on each segment of mask 700. As the light beam is being scanned to illuminate each of the four regions of the target object in the far field, 16 detection signals, as listed below in Table 1, may be generated, which may then be used to reconstruct the profile or image of target object 430 in the far field.

TABLE 1

Detection signals for different scanning beams generated by different detectors

| Beam 1,     | Beam 1,     | Beam 2,     | Beam 2,     |
| Detector 4  | Detector 1  | Detector 4  | Detector 1  |
| Beam 1,     | Beam 1,     | Beam 2,     | Beam 2,     |
| Detector 3  | Detector 2  | Detector 3  | Detector 2  |
| Beam 3,     | Beam 3,     | Beam 4,     | Beam 4,     |
| Detector 4  | Detector 1  | Detector 4  | Detector 1  |
| Beam 3,     | Beam 3,     | Beam 4,     | Beam 4,     |
| Detector 3  | Detector 2  | Detector 3  | Detector 2  |

FIGS. 8A-8D illustrate another example detection optical subsystem 800 for an optical scanning system (e.g., a LIDAR system), according to certain aspects of the present disclosure. Detection optical subsystem 800 includes a detector array 810, an imaging lens subsystem 830 for generating an image of a target object 840 in the far field on an image plane, a secondary optic 820 on the image plane of imaging lens subsystem 830 to direct light to one of N (N=2 in the example shown in FIGS. 8A-8D) detectors in detector array 810. Secondary optic 820 may include a plurality of optical elements, where each optical element may correspond to one area of target object 840 in the far field. For example, in some implementations, secondary optic 820 may include refractive or reflective optic elements, such as micro lenses, wedges, mirrors, prisms, or other implementations. In some implementations, secondary optic 820 may include holographic or diffractive optical elements, such as gratings, holograms, etc.

Figure 8A:
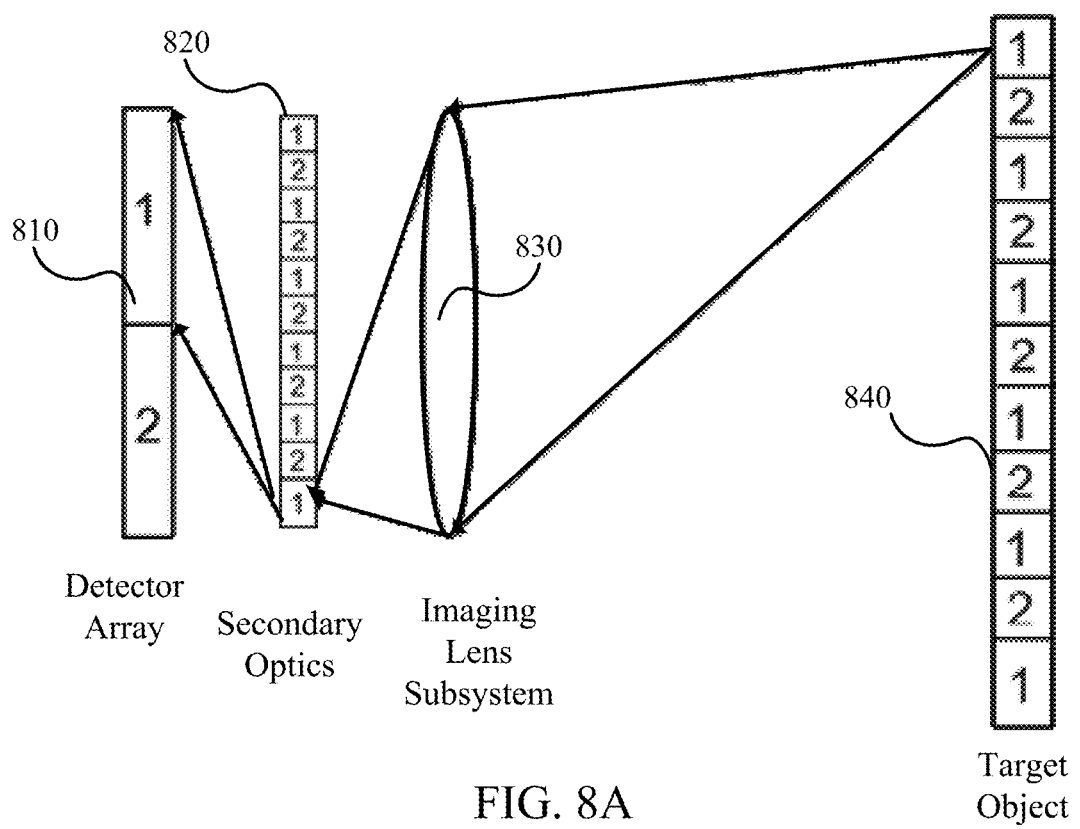
FIGS. 8A-8D illustrate an example detection optical subsystem for an optical scanning system, according to certain aspects of the present disclosure.
Figure 8B:
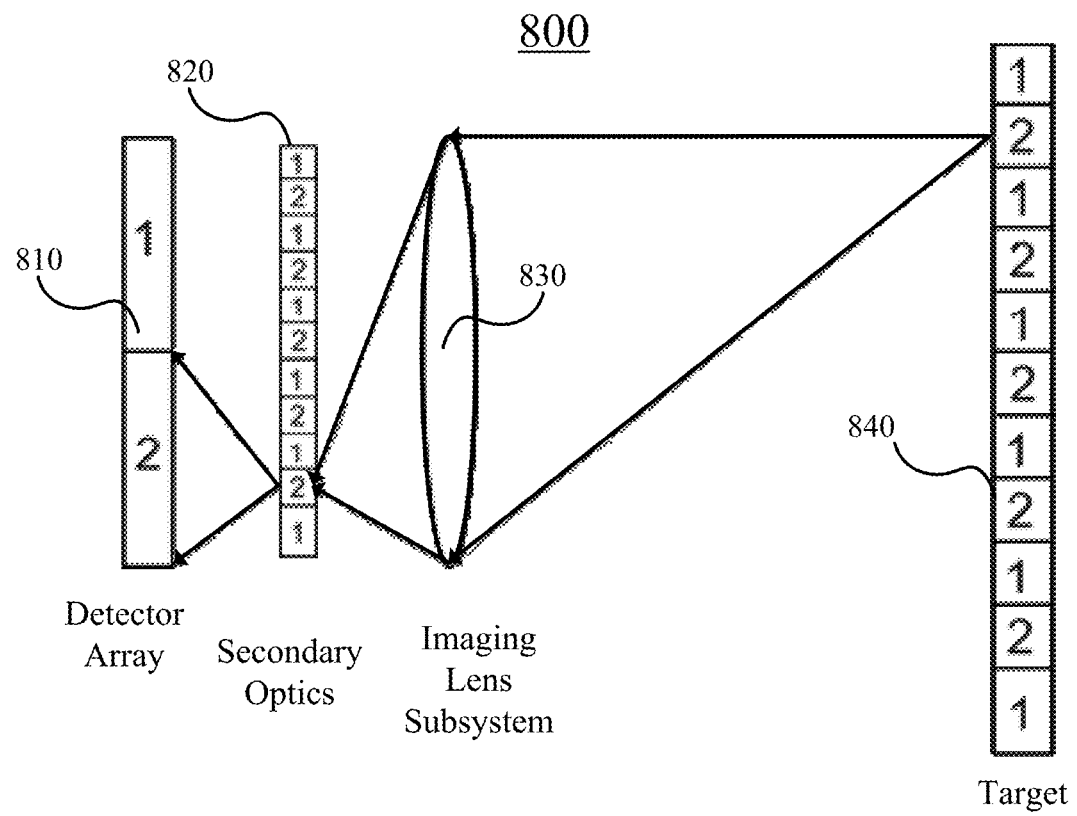

FIG. 8A illustrates an example optical path from a first area of target object 840 to a first detector in detector array 810. FIG. 8B illustrates an example optical path from a second area of target object 840 to a second detector in detector array 810. The first area and the second area of target object 840 may be illuminated by a first scanning beam in one scan step, and may be adjacent to each other. The images of the first area and the second area of target object 840 may be formed by imaging lens subsystem 830 on the bottom two optical elements of secondary optic 820. The image of the first area of target object 840 formed on optical element 1 of the bottom two optical elements of secondary optic 820 may be directed by optical element 1 to detector 1 as shown in FIG. 8A, and the image of the second area of target object 840 formed on optical element 2 of the bottom two optical elements of secondary optic 820 may be directed by optical element 2 to detector 2, as shown in FIG. 8B.

Figure 8C:
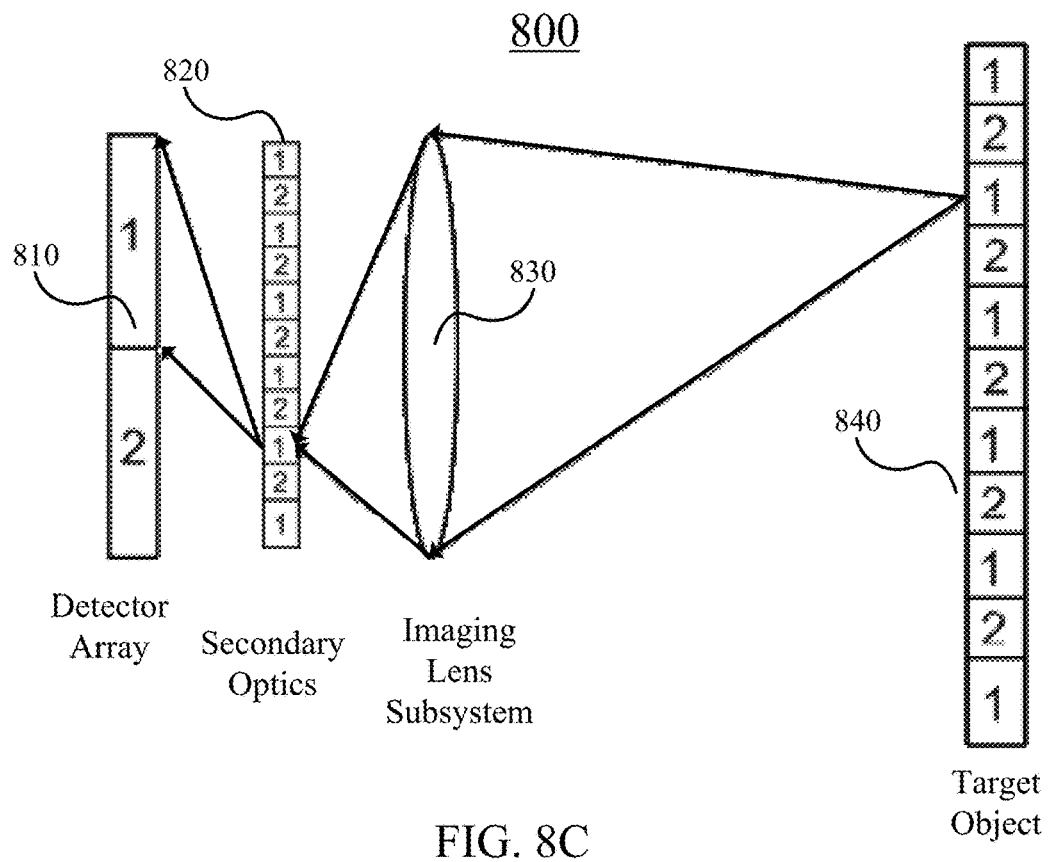
Figure 8D:
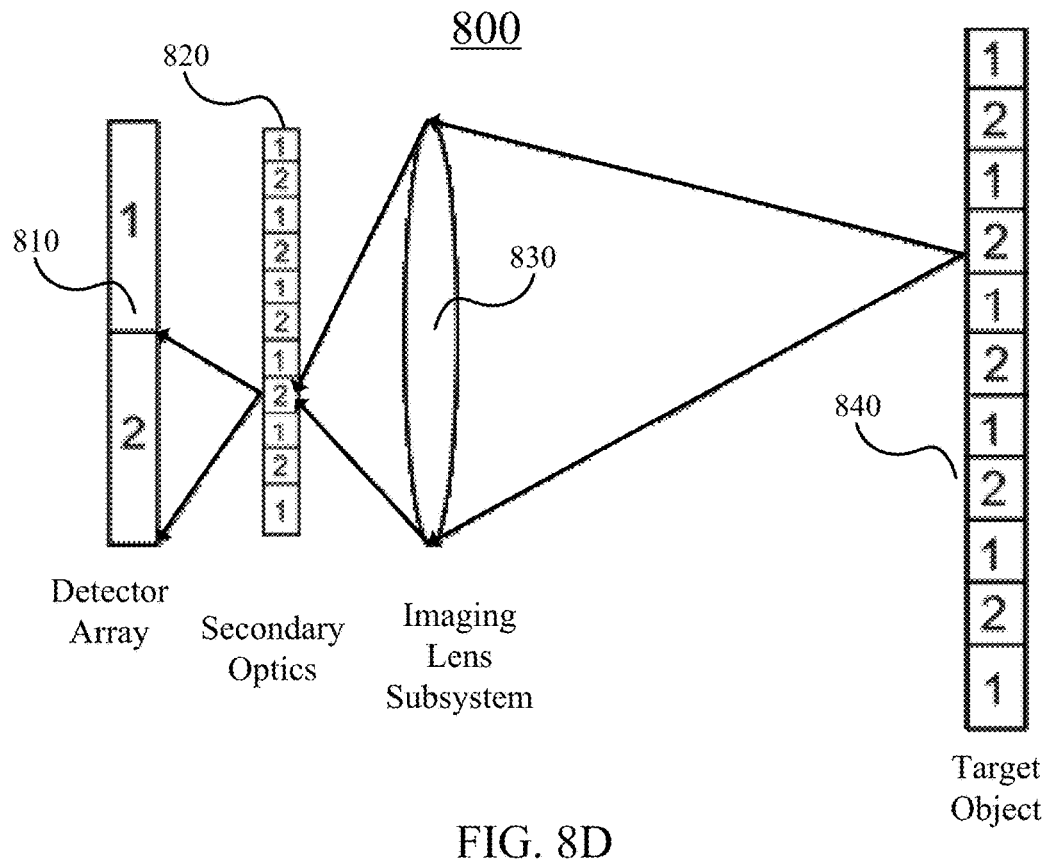

FIG. 8C illustrates an example optical path from a third area of target object 840 to the first detector in detector array 810. FIG. 8D illustrates an example optical path from a fourth area of target object 840 to the second detector in detector array 810. The third area and the fourth area of target object 840 may be illuminated by a second scanning beam in another scan step, and may be adjacent to each other. As shown in FIGS. 8C and 8D, the images of the third and fourth areas of target object 840 may be formed by imaging lens subsystem 830 on the third and fourth optical elements from the bottom on secondary optic 820. The image of the third area of target object 840 formed on the third optical element from the bottom on secondary optic 820 may be directed by the third optical element to detector 1 as shown in FIG. 8C, and the image of the fourth area of target object 840 formed on the fourth optical element from the bottom on secondary optic 820 may be directed by the fourth optical element to detector 2 as shown in FIG. 8D. In this way, the same two detectors may be used to detect the returned light from different areas on target object 840 in each scan step.

It is noted that even though two detectors in a linear array and beam scanning in a vertical direction are illustrated in FIGS. 8A-8D, the beam scanning may be two dimensional, secondary optic 820 may include optical elements arranged in a two-dimensional array, and detector array 810 may be two dimensional and may include any number of detectors as appropriate.

Figure 9A:
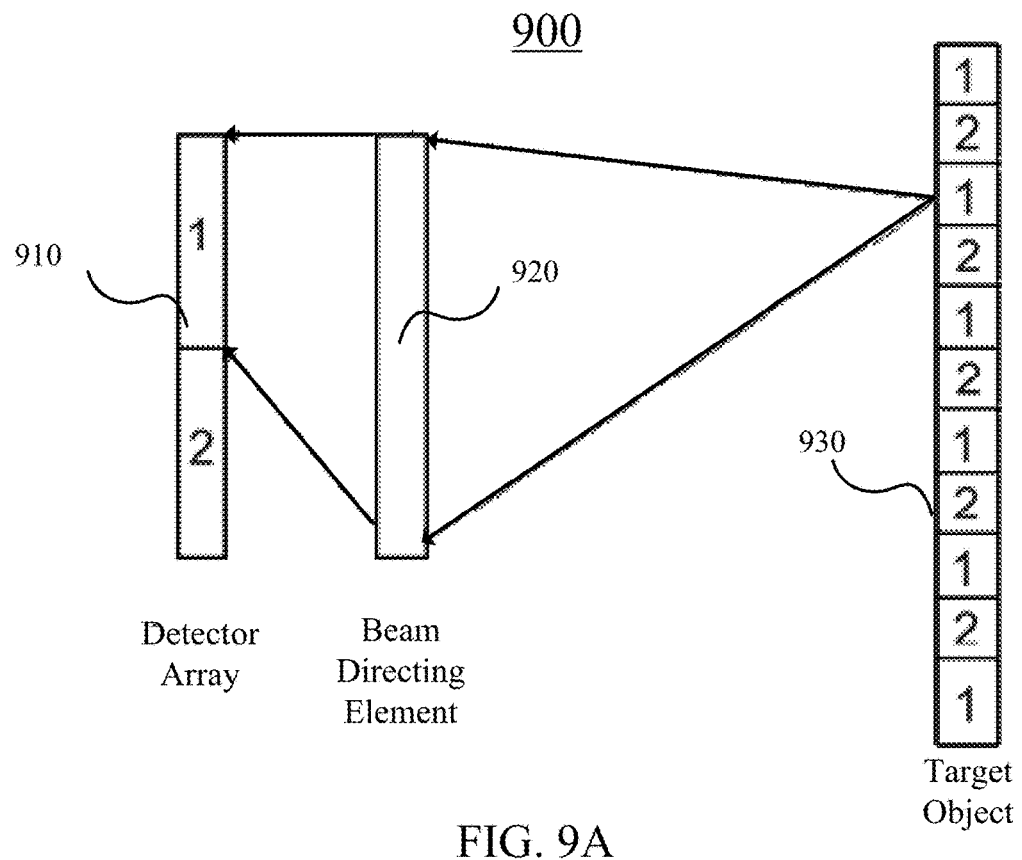
FIGS. 9A-9B illustrate an example detection optical subsystem for an optical scanning system, according to certain aspects of the present disclosure.
Figure 9B:
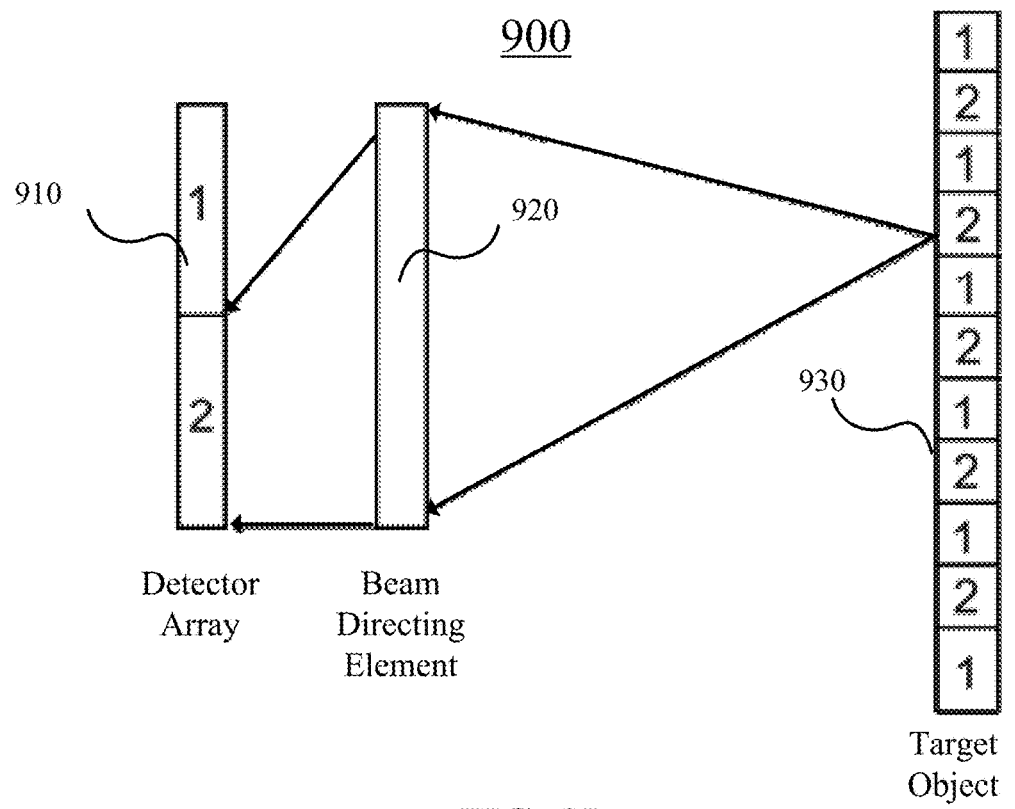

FIGS. 9A-9B illustrate another example detection optical subsystem 900 for an optical scanning system (e.g., a LIDAR system), according to certain aspects of the present disclosure. Detection optical subsystem 900 may include a beam directing element 920, such as a hologram, that may direct light returned from different areas of a target object 930 in the far field onto one of N (N=2 in the example shown in FIGS. 9A-9B) detectors on a detector array 910. Beam directing element 920 may perform the functions of imaging lens subsystem 830 and secondary optic 820 of FIGS. 8A-8D, but an actual image of target object 930 may not be formed (i.e., a non-imaging system). As in FIGS. 8A-8D, target object 930 in the far field may include a plurality of areas, and a scanning light beam may illuminate one or more areas of the plurality of areas in each scan step. During each scan step, beam directing element 920 may direct the returned light beam from each illuminated area of target object 930 to a corresponding detector on detector array 910.

FIG. 9A illustrates an example optical path from a first area of target object 930 to a first detector in detector array 910. FIG. 9B illustrates an example optical path from a second area of target object 930 to a second detector in detector array 910. The first area and the second area may be illuminated by a same scanning beam in one scan step, and may be adjacent to each other. Beam directing element 920 may direct the reflected light beam from the first area to detector 1 and the reflected light beam from the second area to detector 2. In a different scan step, two different areas of target object 930 may be illuminated, and beam directing element 920 may direct the reflected light beam from one of the two areas to detector 1 and the reflected light beam from the other area of the two areas to detector 2. The detectors in detector array 910 may be arranged in any configuration, such as a linear array, a two-dimensional array, or other pattern.

In some embodiments, beam directing element 920 may be a passive device, such as a computer-generated hologram (CGH) or other diffractive optical elements. For example, beam directing element 920 may include a plurality of pixels, where the optical phase (i.e., optical delay) at each pixel may be determined such that light incident from different directions or different areas of the target object in the far field may be directed to corresponding detectors. The optical phase at each pixel of beam directing element 920 may be determined using, for example, the detour-phase method by Lohmann, the interlacing technique, and various simulation and optimization techniques, such as, for example, genetic algorithm, Gauss-Newton algorithm, quantum annealing algorithm, stochastic hill climbing algorithm, etc.

In some embodiments, beam directing element 920 may be an active device with a dynamically reconfigurable phase profile. For example, beam directing element 920 may be synchronized with the scanning beam, and the phase profile of beam directing element 920 may be dynamically reconfigured based on direction of the scanning beam such that light incident from different directions or different areas of the target object in the far field may be directed to different corresponding detectors. In some implementations, beam directing element 920 may include one or more micro-mirrors (e.g., MEMS mirrors) driven by micro-motors for directing the reflected light beam to different detectors.

It is noted that, even though all detectors in the detector array are shown to be used in each scan step in the above examples, in some embodiment, only a portion of all detectors in the detector array may be used in each scan step. For example, a detector array in the beam scanning system may include, for example, 25 (5×5) detectors, and in each scan step, the detection optical subsystem may direct light reflected from the illuminated area to, for example, a set of 16 (4×4) detectors. Thus, during, for example, 10 scan steps, 160 detection signals may be generated. The sets of 16 detectors used in different scan steps may be same or different.

Figure 10:
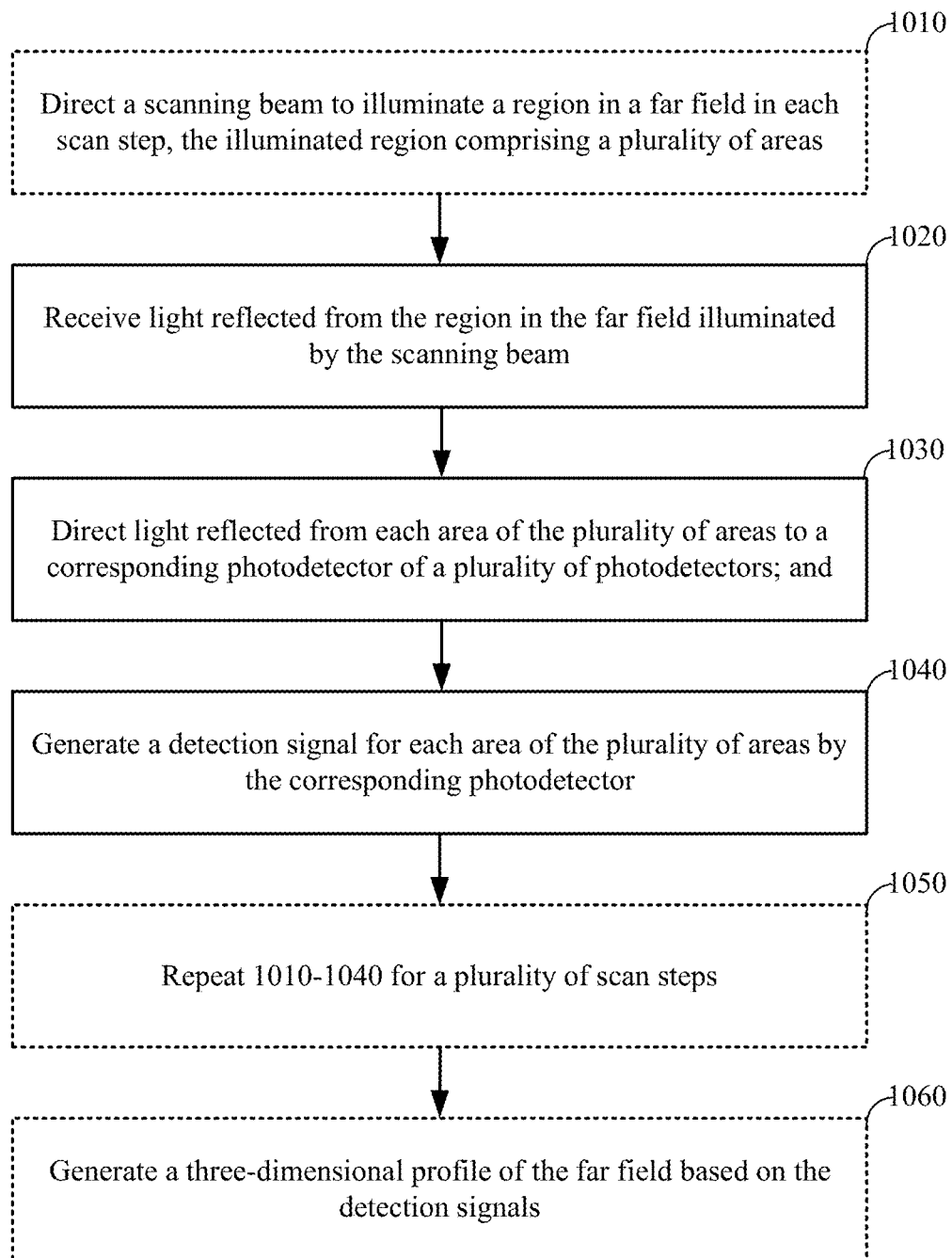
FIG. 10 is a flow chart illustrating an example method for scanning a target object using optical beams in a plurality of scan steps, according to some aspects of the present disclosure.

FIG. 10 is a flow chart 1000 illustrating an example method for scanning a far field using optical beams in a plurality of scan steps, according to some aspects of the present disclosure. At block 1010, a beam scanning subsystem of an optical scanning system may direct a scanning light beam to illuminate a region in the far field in each scan step. The beam scanning subsystem may be any optical beam scanner as described above with respect to FIG. 1. The beam scanning subsystem may have a large scanning beam and/or a large scan step, and the illuminated region in the far field may include a plurality of areas. The beam scanning subsystem may perform a 1-D or 2-D scan in a plurality of scan steps as described above with respect to FIG. 1.

At block 1020, in each scan step, a detection optical subsystem of the optical scanning system, such as detection optical subsystem 500, detection optical subsystem 800, or detection optical subsystem 900, may receive light reflected from the region in the far field illuminated by the scanning light beam.

At block 1030, the detection optical subsystem of the optical scanning system, such as detection optical subsystem 500, detection optical subsystem 800, or detection optical subsystem 900, may direct light reflected from each area of the plurality of areas illuminated by the scanning light beam to a corresponding detector of a plurality of detectors. A number of detectors of the plurality of detectors may be equal to or greater than a number areas of the plurality of areas illuminated by the scanning beam in each scan step, but is less than a total number of areas of the far field. The detection optical subsystem may be implemented according to different configurations and may be configured to direct light reflected from each area of the plurality of areas to a corresponding detector in different manners. For example, the detection optical subsystem may be implemented using an imaging system as shown in FIGS. 5 and 8A-8D, or a non-imaging system as shown on FIGS. 9A and 9B. The detection optical subsystem may include a light filter or mask as illustrated in FIG. 7, or a light deflector, such as refractive, reflective, or diffractive optics described above with respect to FIGS. 8A-8D or a hologram, a diffractive optical element, or one or more micro-mirrors as described above with respect to FIGS. 9A and 9B.

At block 1040, each detector of the plurality of detectors may generate a detection signal corresponding to an area of the plurality of areas. Thus, in each scan step, a detection signal may be generated for each area of the plurality of areas illuminated by the scanning beam. The detection signal may include timing and intensity information of the light beam reflected from the corresponding area in the far field, which may be used to determine certain characteristics of the area in the far field, for example, the depth, reflectivity, or material of the area in the far field.

At block 1050, operations of blocks 1010-1040 may be repeated for a plurality of scan steps. During the plurality of scan steps, the detection optical subsystem may direct light reflected from different illuminated regions onto the same plurality of detectors, and each detector of the plurality of detectors may generate multiple detection signals each corresponding to a different area in the far field. The different areas in the far field measured by a same detector during the plurality of scan steps may be noncontiguous.

Optionally, at block 1060, a three-dimensional profile of the far field may be generated based on the detection signals generated during the plurality of scan steps. For example, the three-dimensional profile of the far field may include the surface profile of objects in the far field, the material of the objects in the far field, the distances of the objects at different areas, etc.

It is noted that even though FIG. 10 describes the operations as a sequential process, some of the operations may be performed in parallel or concurrently. In addition, the order of the operations may be rearranged. An operation may have additional steps not included in the figure. Some operations may be optional, and thus may be omitted in various embodiments. Some operations described in one block may be performed together with operations described at another block. Furthermore, embodiments of the methods may be implemented in hardware, software, firmware, middleware, microcode, hardware description languages, or any combination thereof.

Figure 11:
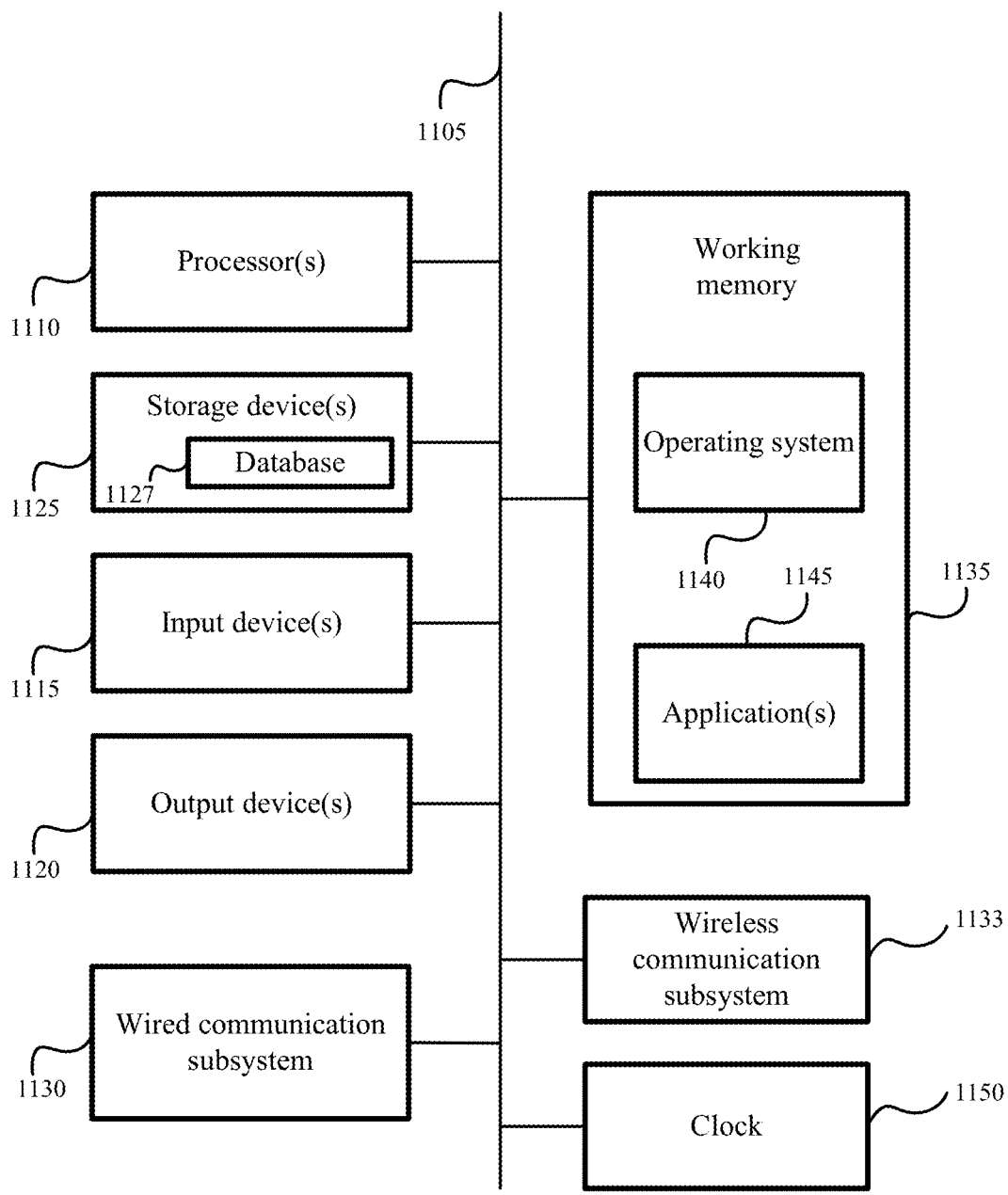
FIG. 11 is a block diagram of an example computing system for implementing some of the examples described herein.

FIG. 11 illustrates components of an example computing system 1100 for implementing some of the examples described herein. For example, computing system 1100 can be used to control optical beam scanner 110 of FIG. 1, beam scanner 410 of FIG. 4, or beam directing element 920 of FIG. 9. It should be noted that FIG. 11 is meant only to provide a generalized illustration of various components, any or all of which may be utilized as appropriate. Moreover, system elements may be implemented in a relatively separated or relatively more integrated manner.

Computing system 1100 is shown comprising hardware elements that can be electrically coupled via a bus 1105 (or may otherwise be in communication, as appropriate). The hardware elements may include processor(s) 1110, one or more input devices 1115, and one or more output devices 1120. Input device(s) 1115 can include without limitation camera(s), a touchscreen, a touch pad, microphone(s), a keyboard, a mouse, button(s), dial(s), switch(es), and/or the like. Output devices 1120 may include without limitation a display device, a printer, LEDs, speakers, and/or the like.

Processor(s) 1110 may include without limitation one or more general-purpose processors, one or more special-purpose processors (such as digital signal processing (DSP) chips, graphics acceleration processors, application-specific integrated circuits (ASICs), and/or the like), and/or other processing structures or means, which can be configured to perform one or more of the methods described herein, such as determining a scan direction or determining a ToF of a laser pulse.

Computing system 1100 can also include a wired communication subsystem 1130 and a wireless communication subsystem 1133. Wired communication subsystem 1130 and wireless communication subsystem 1133 can include, without limitation, a modem, a network interface (wireless, wired, both, or other combination thereof), an infrared communication device, a wireless communication device, and/or a chipset (such as a Bluetooth™ device, an International Electrical and Electronics Engineers (IEEE) 802.11 device, e.g., a device utilizing one or more of the IEEE 802.11 standards described herein), a WiFi device, a WiMax device, cellular communication facilities, etc.), and/or the like. Subcomponents of the network interface may vary, depending on the type of computing system 1100. Wired communication subsystem 1130 and wireless communication subsystem 1133 may include one or more input and/or output communication interfaces to permit data to be exchanged with a data network, wireless access points, other computer systems, and/or any other devices described herein.

Depending on desired functionality, wireless communication subsystem 1133 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN.

Computing system 1100 of FIG. 11 may include a clock 1150 on bus 1105, which can generate a signal to synchronize the various components on bus 1105. Clock 1150 may include an LC oscillator, a crystal oscillator, a ring oscillator, a digital clock generator such as a clock divider or clock multiplexer, a phase locked loop, or other clock signal generator. The clock may be synchronized (or substantially synchronized) with corresponding clocks on other devices while performing the techniques described herein.

Computing system 1100 may further include (and/or be in communication with) one or more non-transitory storage devices 1125, which can comprise, without limitation, local and/or network accessible storage, and/or can include, without limitation, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including, without limitation, various file systems, database structures, and/or the like. For instance, storage device(s) 1125 may include a database 1127 (or other data structure) configured to store detected signals and locations or scanning angles of the light beam, as described in embodiments herein.

In many embodiments, computing system 1100 may further comprise a working memory 1135, which can include a RAM or ROM device, as described above. Software elements, shown as being currently located within working memory 1135, can include an operating system 1140, device drivers, executable libraries, and/or other code, such as one or more application programs 1145, which may comprise software programs provided by various embodiments, and/or may be designed to implement methods, and/or configure systems, provided by other embodiments, as described herein, such as some or all of the methods described in relation to FIG. 10. Merely by way of example, one or more procedures described with respect to the method discussed above might be implemented as code and/or instructions executable by a computer (and/or a processor within a computer). In an aspect, such code and/or instructions can be used to configure and/or adapt a general-purpose computer (or other device) to perform one or more operations in accordance with the described methods.

A set of these instructions and/or code might be stored on a non-transitory computer-readable storage medium, such as non-transitory storage device(s) 1125 described above. In some cases, the storage medium might be incorporated within a computer system, such as computing system 1100. In other embodiments, the storage medium might be separate from a computer system (e.g., a removable medium, such as a flash drive), and/or provided in an installation package, such that the storage medium can be used to program, configure, and/or adapt a general purpose computer with the instructions/code stored thereon. These instructions might take the form of executable code, which is executable by computing system 1100 and/or might take the form of source and/or installable code, which, upon compilation and/or installation on computing system 1100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, ABC, AA, AAB, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

Some portions of the detailed description included herein may be presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A receiver of an optical scanning system comprising:
a set of photodetectors; and
an optical beam directing subsystem configured to, in each scan step of a plurality of scan steps:
receive light reflected from a respective region of a plurality of regions in a far field, the respective region illuminated by a scanning beam and comprising a plurality of areas; and
direct light reflected from each area of the plurality of areas in the respective region to a corresponding photodetector in the set of photodetectors,
wherein each photodetector of the set of photodetectors receives light reflected from a corresponding area of the plurality of areas to generate a detection signal,
wherein the optical beam directing subsystem is configured to, in the plurality of scan steps, direct light reflected from a plurality of noncontiguous areas in the plurality of regions in the far field to a same photodetector in the set of photodetectors.

2. The receiver of claim 1, wherein the optical beam directing subsystem comprises:
a first optical component configured to form an image of the far field on an image plane; and
a second optical component positioned at the image plane, the second optical component comprising a plurality of optical elements, wherein:
each optical element of the plurality of optical elements is configured to direct a portion of light associated with the image to a corresponding photodetector of the set of photodetectors;
a number of optical elements in the plurality of optical elements is greater than a number of photodetectors in the set of photodetectors; and
a different optical element of the plurality of optical elements is configured to direct light to a same photodetector of the set of photodetectors in each scan step of the plurality of scan steps.

3. The receiver of claim 2, wherein the first optical component comprises one or more lenses.

4. The receiver of claim 2, wherein the plurality of optical elements of the second optical component comprises at least one of lenses, prisms, mirrors, or gratings.

5. The receiver of claim 1, wherein the optical beam directing subsystem comprises a diffractive optical element or a holographic optical element configured to direct light reflected from different areas of the far field to different photodetectors of the set of photodetectors in a scan step.

6. The receiver of claim 5, wherein the diffractive optical element or the holographic optical element is dynamically reconfigurable to direct light reflected from different illuminated areas of the far field to different photodetectors of the set of photodetectors.

7. The receiver of claim 1, wherein the set of photodetectors are arranged in a two-dimensional array.

8. The receiver of claim 1, wherein the optical beam directing subsystem comprises:
   a plurality of lenses each configured to form an image of the far field on an image plane; and
   a mask positioned on the image plane, the mask comprising a plurality of segments,
   wherein the set of photodetectors is positioned at a side of the mask opposite to the plurality of lenses, each photodetector of the set of photodetectors associated with a segment of the mask, and
   wherein each segment of the mask is configured to filter an image of the far field to allow a portion of the image to be detected by the photodetector associated with the segment of the mask.

9. The receiver of claim 8, further comprising a second plurality of lenses positioned between the mask and the set of photodetectors, wherein each lens of the second plurality of lenses is configured to concentrate light passing through a corresponding segment of the mask onto the photodetector associated with the corresponding segment of the mask.

10. The receiver of claim 8, wherein the mask comprises a light valve.

11. The receiver of claim 8, wherein each lens of the plurality of lenses is associated with a segment of the mask.

12. A method for scanning a far field using optical beams in a plurality of scan steps, the method comprising, in each scan step,
   receiving light reflected from a respective region of a plurality of regions in the far field, the respective region illuminated by a scanning beam and comprising a plurality of areas;
   directing light reflected from each area of the plurality of areas in the respective region to a corresponding photodetector of a plurality of photodetectors; and
   generating a detection signal for each area of the plurality of areas by the corresponding photodetector,
   wherein a number photodetectors in the plurality of photodetectors is equal to or greater than a number of areas in the plurality of areas in the respective region illuminated by the scanning beam in each scan step, but is less than a total number of areas in the plurality of regions in the far field;
   wherein the same plurality of photodetectors is used in each scan step of the plurality of scan steps; and
   wherein, in the plurality of scan steps, light reflected from a plurality of noncontiguous areas in the plurality of regions in the far field is directed to a same photodetector in the plurality of photodetectors.

13. The method of claim 12, wherein directing light reflected from each area of the plurality of areas to the corresponding photodetector of the plurality of photodetectors comprises:
   forming, by a first optical component, an image of the illuminated respective region of the plurality of regions in the far field on an image plane; and
   directing, by each optical element of a plurality of optical elements of a second optical component positioned at the image plane, a portion of light associated with the image to a corresponding photodetector of the plurality of photodetectors,
   wherein a number of optical elements in the plurality of optical elements is greater than a number of photodetectors in the plurality of photodetectors; and
   wherein a different optical element of the second optical component is configured to direct light to a same photodetector of the plurality of photodetectors in each scan step of the plurality of scan steps.

14. The method of claim 12, wherein directing light reflected from each area of the plurality of areas to the corresponding photodetector of the plurality of photodetectors in each scan step comprises:
   reconfiguring a diffractive optical element or a holographic optical element; and
   directing, by the diffractive optical element or the holographic optical element, light reflected from different areas of the far field to different photodetectors of the plurality of photodetectors.

15. The method of claim 12, wherein directing light reflected from each area of the plurality of areas to the corresponding photodetector of the plurality of photodetectors in each scan step comprises:
   forming, by each lens of a plurality of lenses, an image of the far field on an image plane; and
   filtering, by a corresponding segment of a plurality of segments of a mask positioned on the image plane, the image of the far field to allow a portion of the image to be detected by a photodetector associated with the corresponding segment of the mask,
   wherein the plurality of photodetectors is positioned at a side of the mask opposite to the plurality of lenses, each photodetector of the plurality of photodetectors associated with a segment of the mask.

16. The method of claim 15, wherein directing light reflected from each area of the plurality of areas to the corresponding photodetector of the plurality of photodetectors in each scan step further comprises:
   concentrating, by each lens of a second plurality of lenses positioned between the mask and the plurality of photodetectors, light passing through the corresponding segment of the mask onto the photodetector associated with the corresponding segment of the mask.

17. An apparatus comprising:
   means for, in each scan step of a plurality of scan steps, receiving light reflected from a respective region of a plurality of regions in a far field, the respective region illuminated by a scanning beam and comprising a plurality of areas;
   means for, in each scan step of the plurality of scan steps, generating a detection signal for each area of the plurality of areas; and
   means for, in each scan step of the plurality of scan steps, directing light reflected from each area of the plurality of areas to a corresponding means for generating the detection signal,
   wherein, in each scan step of the plurality of scan steps, each means for generating the detection signal receives light reflected from a corresponding area of the plurality of areas to generate the detection signal, and
   wherein, in the plurality of scan steps, light reflected from a plurality of noncontiguous areas in the plurality of regions in the far field is directed to a same means for generating the detection signal.

18. The apparatus of claim 17, wherein the means for directing light reflected from each area of the plurality of areas to the corresponding means for generating the detection signal comprises:
- means for forming an image of the illuminated respective region of the plurality of regions in the far field on an image plane; and
- means for directing each portion of light associated with the image to the corresponding means for generating the detection signal, wherein the means for directing each portion of light associated with the image is positioned at the image plane,
- wherein a number of means for directing each portion of the light associated with the image is greater than a number of means for generating the detection signal; and
- wherein a different means for directing each portion of the light associated with the image is configured to direct light to a same means for generating the detection signal in each scan step of the plurality of scan steps.

19. The apparatus of claim 17, wherein the means for directing light reflected from each area of the plurality of areas to the corresponding means for generating the detection signal comprises:
- means for forming a plurality of images of the far field on an image plane; and
- means for filtering each image of the plurality of images of the far field to allow a portion of the image to be detected by a corresponding means for generating the detection signal,
- wherein the means for generating the detection signal is positioned at a side of the means for filtering opposite to the means for forming the plurality of images of the far field.

* * * * *